United States Patent Office 3,258,317
Patented June 28, 1966

3,258,317
PREPARATION OF DENSE URANIUM OXIDE
Denis Stanislas Brearton, Port Hope, Ontario, Canada, assignor to Atomic Energy of Canada Limited, Ottawa, Ontario, Canada, a corporation
No Drawing. Filed Apr. 25, 1963, Ser. No. 275,532
14 Claims. (Cl. 23—355)

This invention is concerned with producing high density uranium oxide material (particularly stoichiometric $UO_2$) suitable for use in power or other nuclear reactors. The $UO_2$ required has a density of at least about 10.0 gm./cc. and an O/U atomic ratio of about 2.025 to 2.000.

The usual method of obtaining $UO_2$ fuel elements is by pelletization of a suitable powder followed by subsequent sintering and reduction in a hydrogen or cracked ammonia atmosphere at temperatures of the order of 1600–1800° C. for several hours. This high temperature process requires expensive retort-type furnace and uses costly hydrogen-rich explosive atmospheres for sintering and reduction. Sintering in a steam atmosphere at about 1400° C. has recently been proposed (British Patent No. 844,980—August 17, 1960), but a preliminary reduction to near stoichiometry (O/U 2.04 or less) in hydrogen as well as subsequent reduction and cooling in hydrogen was necessary.

The purpose of the present invention is to provide an economical process for sintering to a high density and reducing to near stoichiometry, uranium oxide bodies. A further purpose is the provision of a heating, sintering, reducing, and cooling cycle which avoids high temperatures (above 1450° C.), avoids the necessity of a preliminary reduction to near stoichiometry, and requires a minimum of time. A further purpose is to avoid the use of an explosive gas to a larger extent.

The process of the present invention comprises the initial steps of preparing compacts of uranium oxide powder, having a surface area of at least one square metre per gram, and heating the compacts to about 200–300° C. in the furnace in the presence of an inert gas (e.g. carbon dioxide, nitrogen, argon) or a hydrogen-poor hydrocarbonaceous gas. By hydrogen-poor is meant containing less than about 3 vol. percent hydrogen. The material is then heated to a peak temperature of about 1100–1450° C. while an atmosphere comprising steam is fed to the the furnace. The heating rate is less than 300° C. per hour. At the peak temperature a "soak" period in steam is maintained for about 0.5 to 3 hours. During this "soak" period the uranium oxide bodies are densified to above 90% theoretical density. While at peak temperature or at least above 1000° C., hydrocarbon or partially burned hydrocarbon reducing gas containing from 3 to about 25 vol. percent hydrogen is used to displace the steam in the furnace. Reduction to an O/U ratio of less than about 2.025 is obtained in times from about 10 min. to several hours depending mainly on the temperature, the gas used, the charge size, and final O/U ratio desired. The densified reduced charge is then cooled to about 1000° C. or less in a suitable inert gas or a hydrogen-poor hydrocarbonaceous gas. If accelerated cooling from 1000° C. is desired a steam atmosphere can be carefully substituted (while avoiding thermal shock) without measurable reoxidation. The cooling rate should also not exceed 300° C. per hour. Surprisingly, no measurable reoxidation or phase change has been found to occur using steam cooling below about 1000° C., after reduction according to the present process. The difference in final O/U ratio between steam cooling and cooling in hydrocarbonaceous gas is less than 0.002.

It would be expected that the hydrocarbon and carboxide gases present in the reducing gases used would contaminate the sintered product by introducing significant quantities of carbon therein. Such contamination would be detrimental in causing high aqueous corrosion rates in use. However, chemical analysis of the product of the present process surprisingly shows the carbon content to be much less than 100 p.p.m. and to comply with reactor-use specifications.

The reducing gases used can be any of the liquified petroleum gases (e.g. propane, butane) or the natural gas mixtures available in many localities. It is desirable to partially burn the gas to provide the minimum required volume at lowest cost of reducing gas, and to limit risks of explosion by minimizing the hydrogen content of the gas fed to the furnace. The gas is partially burned in a gas generator by mixing with air at a chosen ratio and igniting the mixture. The partially burned gas is fed to the furnace without further treatment. The gas should be free of any oxidizing gases such as oxygen.

For purging, initial heating, cooling, or blanket use the hydrogen content of the gas is not greater than about 3 vol. percent, such a gas being non-explosive. A suitable gas for these purposes has been prepared from Alberta natural gas (which is about 93% methane and 3% ethane): e.g. air is mixed with the gas in a 15:1 volume ratio and ignited.

For use in the reduction part of the cycle the hydrogen content can be from 3 to 25 vol. percent. From 5 to 15 percent is preferred. There is no significant advantage in going above about 25 vol. percent hydrogen. The maximum hydrogen content obtainable will be limited by that of the starting gas used. The operative minimum hydrogen content will depend on the final desired O/U ratio, and the permitted reducing times at or near peak temperature. A hydrogen-poor reducing gas which is non-explosive can be used for the entire reduction if an O/U ratio above about 2.020 is permitted. A very suitable gas for the reduction stage was obtained by mixing air with Alberta natural gas in the volume ratio 9:1 and after combustion a residual hydrogen content of 8 vol. percent was present. With liquefied petroleum gases the air to gas ratio can be increased, e.g. for propane or butane to about 20:1 to give a residual hydrogen of about 8 vol. percent.

The uranium oxide starting material may be any sinterable powder having an O/U atomic ratio from about 2.000 up to about 2.25—although ratios higher than this can be used. The initial particle size is not critical, but is desirably of the order of about one micron for best sintering. Powders of surface area per unit weight within the range 1 to 18 sq. metres per gram (B.E.T.) can be sintered by this process. The preferred range is 7 to 10 sq. metres per gram. The sinterability is poorer near the lower limits and enhanced pyrophoric tendencies are detrimental near the upper limits. The preparation of suitable powders is known in the art: e.g. the powder can be ball-milled to achieve particle size reduction; wetting and granulation with or without binders, and/or lubricant can be used; or precompaction then crushing can be resorted to. The powders are compacted in any suitable manner into desired shapes, arranged into batch charges, and loaded into the cool furnace.

Non-oxidizing blanket gases for the initial heating to about 300° C. may be carbon dioxide, argon or nitrogen instead of the hydrocarbonaceous gas. The main heating (from 300° C. to peak temperature) is conducted in an atmosphere comprising steam, e.g. moist reducing gas, moist nitrogen, moist argon—or preferably steam per se. Inert gases for the initial cooling after reduction may be nitrogen or argon instead of the hydrogen-containing hydrocarbonaceous gas. The cooling below 1000° C. is carried out in inert gas, reducing gas—or preferably steam. Throughout the heating and cooling care is taken to avoid thermal shock to the charge.

The preferred cycle is summarized as follows:

| Temp., °C. | Atmosphere | Time, hrs. |
|---|---|---|
| 150° to 300° C | Partially burned hydrocarbonaceous (less than 3% hydrogen). | 1-2 |
| 300° C. to peak | Steam | 8-14 |
| Peak (sintering) | Steam | 1-2 |
| Peak to 1,000° C. (reduction). | Partially burned hydrocarbonaceous reducing gas (5-15% hydrogen). | 1-3 |
| 1,000° C. to 300° C | Steam | 3-8 |
| 300° C. to 150° C | Partially burned hydrocarbonaceous (less than 3% hydrogen). | 1-2 |

The total time for the complete cycle normally ranges from about 15 to about 30 hours. In the prior processes cycle time ranged from about 30 to about 40 hours. An important feature of the present process is the rapid transition from steam sintering to reduction at or near peak temperature without delay, interruption of heating, or disturbing the charge. Rapid heating was usually found desirable (to the limits of thermal shock) to minimize cycle time. A furnace of the batch type and having exposed elements was designed and found to be very suitable for carrying out the process.

*Example*

A preferred method is as follows:

(1) Ceramic-grade powder manufactured by the ammonium diuranate route having an O/U ratio of 2.18 and a surface area per unit weight of 0.9 measured by the Blaine method (equivalent to about 9 m.$^2$/gm.) was compacted into cylindrical pellets about 0.5 in. in diameter and 0.5 in. in length to a density of 5.6 gm./cc.

(2) The pellets were placed in ceramic (e.g. mullite) saggars with suitable insulating grain (e.g. alumina) completely filling up the saggars.

(3) The saggars were introduced into the furnace, the furnace temperature being less than 150° C., after which the furnace was sealed and purged with lean reducing gas (partially burned hydrocarbonaceous gas of less than 3 vol. percent hydrogen).

(4) The furnace was slowly heated to 300° C. in 2 hours while maintaining a slight flow of the lean reducing gas through the furnace.

(5) The gas supply to the furnace was changed from hydrocarbonaceous gas to steam; the steam feed was maintained while heating the furnace and charge slowly (over a 12 hour period) to 1350° C., and held for one hour at this temperature.

(6) While maintaining the 1350° C. temperature for one further hour the steam feed was changed to rich reducing gas (partially burned hydrocarbonaceous gas of 8 vol. percent hydrogen obtained by igniting Alberta natural gas at an air to gas ratio of 9:1).

(7) The power was switched off and the furnace allowed to cool to about 1000° C. (in three hours), with flow of the rich reducing gas maintained.

(8) At 1000° C. the gas feed was changed to steam, the initial slow rate of steam feed being increased over 0.5 hour to avoid thermal shock—a high rate of cooling being achieved due to the large thermal capacity of steam.

(9) After about 5 hours when the charge temperature was 300° C. the gas feed was changed to the lean reducing gas and maintained until the charge was below 150° C.

(10) The furnace was unsealed and the densified reduced UO$_2$ charge removed for machining or other processing. The final density was 10.70 gm./cc. and the O/U ratio was 2.010. Thermogravimetric analysis revealed no significant change in O/U ratio due to the steam cooling (compared to cooling in inert or reducing gas). Carbon content was about 40 p.p.m. An increase in final fuel density of about 0.2 gm./cc. has been obtained compared to equivalent high temperature (about 1650° C.) processing.

When the surface area per unit weight of the starting powder is controlled within the stated limits it is not necessary to reduce the O/U ratio to below 2.04 before steam sintering according to the present process. Equally favorable results have been obtained using powders having O/U ratios above and below 2.10 and using inert gases and steam for the warm-up to sintering temperature (thus avoiding any reduction in situ). During steam sintering the O/U ratio approaches an equilibrium value of about 2.10 at the temperatures stated whether the ratio is initially above or below 2.10. It is preferred in the present process to use uranium dioxide powder prepared by the ammonium diuranate (ADU) route.

The sintering rate is significant below 1200° C., even down to about 950° C. Steam sintering according to the present process has been found to result in a density of 10.6 gm./cc. (97% theor.) in 1 hour at 1050° C. (initial density 5.8 gm./cc.).

Under current locally prevailing costs, the method of this invention has significantly reduced the cost of sintering fuel elements for power reactor use compared with the conventional process using high hydrogen content gases and high temperature furnaces.

I claim:

1. A method of producing a dense uranium oxide body which comprises compacting an uranium oxide powder having a surface area per unit weight of from 1 to 18 sq. metres/gm. heating the compacted body in a steam-containing atmosphere to sintering temperatures, sintering the compacted body in a steam atmosphere below about 1450° C., and subjecting the sintered body while above about 1000° C. to a hydrocarbonaceous reducing gas containing hydrogen in amounts from about 3 to 25 volume percent until the O/U ratio is reduced to below about 2.025.

2. The method of claim 1 wherein the compacted body is sintered at a temperature of from about 1100 to about 1450° C. to a density of at least 10.50 gm./cc.

3. The method of claim 1 wherein the reducing gas is a partially burned hydrocarbonaceous gas containing from 5 to 15 volume percent hydrogen.

4. The method of claim 1 wherein the reducing gas is a partially burned natural gas.

5. The method of claim 1 wherein the O/U ratio is reduced to below about 2.015.

6. The method of claim 1 wherein the sintered and reduced body is cooled from about 1000° C. to about 300° C. in a steam atmosphere.

7. The method of claim 1 wherein the sintered and reduced body is cooled in a hydrocarbonaceous gas atmosphere having less than 3 vol. percent hydrogen.

8. The method of claim 1 wherein the compacted body is heated to about 300° C. in a hydrocarbonaceous gas atmosphere having less than 3 vol. percent hydrogen, and heated to sintering temperature of from about 1100° C. to about 1450° C. in a steam atmosphere.

9. The method of claim 1 wherein the compacted body is heated to about 300° C. in an inert gas atmosphere, and heated to sintering temperature of from about 1100° C. to about 1450° C. in a steam atmosphere.

10. The method of claim 1 wherein the surface area per unit weight of the uranium oxide powder is from 7 to 10 sq. metres per gram.

11. The method of claim 1 wherein the uranium oxide powder is prepared by the ammonium diuranate route.

12. The method of claim 1 wherein the time of exposure to the reducing gas is from 10 minutes to 3 hours.

13. A method of producing a dense uranium oxide body which comprises:

(a) compacting a UO$_2$ powder having a surface area per unit weight of from 1 to 18 sq. metres/gm. into a shaped body, (b) heating the compacted body in a non-oxidizing gas to about 300° C.,
(c) further heating the body to a peak temperature of from 1100° C. to 1450° C. in a steam atmosphere,
(d) retaining the body near said peak temperature and in a steam atmosphere until the density is at least 10.50 gm./cc.,
(e) retaining the body at a temperature of above 1000° C. in a hydrocarbonaceous gas atmosphere containing from 3 to 25 volume percent hydrogen until the O/U ratio is below 2.020,
(f) cooling the body to about 1000° C. while in a hydrocarbonaceous reducing gas atmosphere, and
(g) further cooling the body while in an atmosphere selected from the group consisting of inert gas, reducing gas, or steam.

14. The method of claim 13 wherein the cooling (g) below 1000° C. is carried out in steam to about 300° C. and in a hydrocarbonaceous gas atmosphere having less than 3 vol. percent hydrogen below 300° C.

References Cited by the Examiner
UNITED STATES PATENTS 3,051,566  8/1962  Schwartz.
3,087,876  4/1963  Courtland et al.

OTHER REFERENCES

AEC Report WAPD-PWR-PMM-491, September 1956, pp. 77–87.
AEC Report TID-7546, Book 2, November 1957, pp. 387, 411, 417, 434–436, 471 and 474–477.

CARL D. QUARFORTH, *Primary Examiner.*
REUBEN EPSTEIN, *Examiner.*